(12) United States Patent
Koller

(10) Patent No.: US 6,497,815 B1
(45) Date of Patent: Dec. 24, 2002

(54) SIEVE WITH SUCTION CLEANING AND BYPASS ELEMENTS

(76) Inventor: Josef Koller, Ziegeleiweg 26, D-40699 Erkrath (DE)

( * ) Notice: Subject to any disclaimer, the term of this patent is extended or adjusted under 35 U.S.C. 154(b) by 0 days.

(21) Appl. No.: 09/587,081

(22) Filed: Jun. 3, 2000

(30) Foreign Application Priority Data

Jun. 4, 1999 (DE) .......................................... 199 25 630

(51) Int. Cl.$^7$ .............................................. B01D 29/68
(52) U.S. Cl. ........................ 210/130; 210/415; 210/448; 210/455; 210/456; 210/497.01
(58) Field of Search .................. 210/107, 133, 210/413, 414, 415, 446, 448, 455, 456, 497.01, 130

(56) References Cited

U.S. PATENT DOCUMENTS 1,977,601 A * 10/1934 Winton ......................... 210/167
3,256,995 A * 6/1966 Schmid et al. ............... 210/411

FOREIGN PATENT DOCUMENTS

EP 0 268 752 1/1988
FR 1550383 * 11/1968 .................. 210/413

OTHER PUBLICATIONS

English–language abstract of EP 0 268 752.

* cited by examiner

Primary Examiner—Matthew O. Savage
(74) Attorney, Agent, or Firm—Norris McLaughlin & Marcus (57) ABSTRACT

A device is described for mechanically cleaning fluids, especially for [cleaning] the cooling water that enters a heat exchanger, having a pipe segment (12) as housing, a sieve element (20) that essentially covers the cross section of the pipe, and a suction device (20) on influx side (22) that is capable of moving around an axle (18), the purpose of the device being to aspirate the surface area of sieve element (16) and in this manner clean it, wherein, according to the invention, sieve element (16) forms a partially cylindrical casing having a cylindrical axle (56) perpendicular to axle (24) of pipe segment (12), wherein the open part of cylindrical casing (16) is arranged toward influx side (22) (FIGS. 1, 2).

8 Claims, 8 Drawing Sheets

SIEVE WITH SUCTION CLEANING AND BYPASS ELEMENTS

The present invention relates to a device for mechanically cleaning fluids, in particular, for cleaning the cooling water entering a heat exchanger, having a segment of pipe as housing, a sieve element essentially covering the cross-section of the pipe segment, with a suction device, moveable around an axle on the influx side for suctioning off the surface area and in this manner cleaning the sieve element.

This type of device is already known from DE 39 17 520 C2.

The device known from this document is a further development and improvement of a device known from DE 36 40 638 C1; see also the parallel device known from EP 0 268 752 A1, in which the cutting plane of the rotationally symmetrical filter is arranged on a cross sectional plane of the feed pipe, for example, in a wall connection. The jet of the aspirating device is capable of being rotated around the middle axle of the feed pipe by an electrical motor, where the motor is arranged on the drainage side of the sieve element inside the feed pipe. This arrangement inside the feed pipe impedes access from the outside to the drive motor, as well as, access to the mounting/suspension and the seal.

In DE 38 01 015 A1, a wheel-shaped filter element is in the cross-sectional plane of the feed pipe. In order to clean the sieve, it is mounted in such a way that it can be rotated around the axle of the filter housing and an aspirating element extending along a radius of the filter element is arranged on the feed side of the filter element and is connected to the drainage pipe. In this case, the entire sieve has to be rotated, which necessitates an extensive array of sprockets and cogwheels made of highly non-corrosive materials. In addition, particles of dirt can settle on the edges of the teeth of the gears and cause locking. Moreover, the flat sieve plate requires extensive reinforcement. Since the fluid to be cleaned is usually sea-water, very expensive materials have to be utilized.

In this respect, the arrangement mentioned initially, according to DE 39 17 520 C2, already represents an advancement, albeit, one has to accept the disadvantage, that the mesh surface area of the sieve has a geometrically complicated shape and can only be manufactured with very costly technical production methods.

This disadvantage also holds true for DE 36 40 638 C1. In addition, it can be said about this document, that, in this case, the pipe cross section is divided into sectors and the aspirating device has the shape of one of the sectors, wherein the aspirating pipe runs along the middle of the pipe, so that the backwash of the sieve is stronger in the vicinity of the aspirating pipe while in the vicinity of the outer wall that has the larger mesh surface area of the sieve, the aspiration is weaker. In conditions of severe accumulation of detritus, the reduced intensity of the back wash in the vicinity of the outer surface of the pipe wall is insufficient to remove the detritus from the surface of the sieve and carry it away.

Each of the U.S. Pat. Nos. 2,275,958 and 1,977,601 describes an apparatus in which the actual filtering process takes place in a housing, which is cast. The sieve is mounted so that it is accessible by way of a lid and the mesh area of the sieve is cleaned by a rotating suction device. The axle of rotation is encased by a cylindrical sieve element and is perpendicular to the pipe axle of the incoming pipe in its own, complex casing, in which fluid passes through the sieve element from the inside to the outside. The drive motor is located advantageously outside of the feed pipes and can, therefore, be accessed from the outside, together with the seals and the support system.

The objective of the invention is to improve on the device mentioned at the beginning, in such a manner, that manufacturing it is simplified and less expensive and that the manner of operation is not changed for the worse.

This objective is achieved in that the sieve element forms a partially cylindrical casing, wherein the axle of the cylinder is perpendicular to the axle of the pipe segment and the open part of the partially cylindrical casing is arranged toward the influx side.

This arrangement will achieve, for one thing, that similar to the U.S. Pat. Nos. 2,275,958 and 1,977,601 as well as to DE 39 17 520 C2, the document chosen as related art, the drive motor for the suction device, capable of being rotated around an axle, is also located outside of the pipe segment and, therefore, is easier to access and service. In addition, an arrangement of this type does not necessitate a complicated type of housing for the device as described in U.S. Pat. Nos. 2,276,958 or in 1,977,601, nor is a complicated type of sieve necessary, as shown in DE 36 40 638 C1, which can only be manufactured by a very costly technical process.

In contrast to this, the device according to the invention uses a sieve with a symmetrical shape which can be easily manufactured, namely, a (partially) circular shape, if necessary, complemented by straight extensions attached to the partial circle.

In order to accommodate the necessary mesh surface area of the sieve and keep the flow-through resistance small, it is advantageous, if, according to a further development of the invention, the housing is enlarged, so that the pipe segment has a region with a larger diameter than the adjoining sealing pipe, wherein, according to a further development, the pipe segment is composed of two partial pipe segments that are coupled together, these partial pipe segments extending conically in a direction facing each other, wherein, these partial pipe segments are connected with joiner pipes by flanges. According to another alternative, the undivided pipe segment has a larger diameter. In this manner, the necessary mesh surface area of the sieve can be successfully provided for in both of the alternatives. In the embodiment having cone-shaped pipe segments, according to a further development of the invention, a round holding plate with a rectangular opening is arranged between the two sections, the edge of the open end of the partially cylindrical casing being fastened to this holding plate so that this partially cylindrical casing covers the rectangular opening. According to another development of the invention, the partially cylindrical casing is closed by side walls through which the axle of the rotating or oscillating motor of the suction device is placed. According to further developments, these side walls can be constructed either completely closed or also as a sieve.

According to another development of the invention, the rotor of the suction device is connected on one side to a drive motor and on the opposite side to an aspirating pipe, through which the waste water together with the aspirated detritus can be disposed of.

The sieve can be provided with webs, however, according to a further development of the invention it can also be constructed without webs. If sieves with webs are used, then it is advantageous, according to another development of the invention, if the sieves provided with webs form chambers, by way of the webs, with a specific length and width, and if the open end of the suction pipe has the same length and width as these chambers. By way of this adaptation, each chamber created in this manner can be sealed, thus creating a strong reflux and securing the disposal of the detritus.

The webs have the advantage that large pieces of detritus, such as stones, mussels, fish etc, can be deposited on the sieve between the webs without disturbing or hindering the rotating motion—it can also be an oscillating, swinging motion—of the aspiration rotor.

The mesh surface area of a sieve provided with webs can be constructed out of flat sieve plates placed together, thereby forming a polygon. This is advantageous if the sieve cannot be bent into a cylindrical shape by conventional milling. It is also advantageous, when using a sieve with webs having various heights, that the center of the sieve is arranged different from the center of the rotor.

In order to hold together the cross-sectional flow of the aspiration rotor, it may be beneficial to divide it into two aspirating pipes or aspirating channels/conduits. It is advantageous in the embodiment having two rectangular aspiration pipes that these are annealed out of two tins and are welded together with a half-rounded turned edge in the area connecting with the waste water pipe.

This results in a particularly advantageous, finished product.

Equipping the device according to the invention allows two pressure relief plates to be provided without great cost that function as by-pass conduits. This construction enables the rotor to move either in an oscillating or rotating manner.

The cross-section of the sieve element can be a semicircle with attached, straight extensions that are parallel to each other (U-form). This results in a greater mesh surface area of the sieve and, thus, decreased pressure reduction.

If two or more sieve elements are provided, the result is an increased reliability through redundance. Changing seals and maintenance of the individual sieve elements is possible while the other sieve element remains in operation. In addition, the length of construction is reduced, which facilitates the modernization of conventional cooling water filters, since there is usually little space at one's disposal.

According to still another development, the holding plates in the region at the end of the cylindrical sieve casing jut into the cross-sectional flow, this results in areas of turbulence TK. The turbulence thus created in the flow causes the unbent part of the sieve to clean itself, for example, the sieve element which is U-shaped in cross-section.

In the embodiment without inner segmental ribs, large volumes of detritus can be moved by the rotor until the suctioning orifice of the rotor is clear and the detritus can be aspirated.

The invention is more clearly described using exemplary embodiments, which are illustrated in the drawings.

DESCRIPTION

Figure 1:
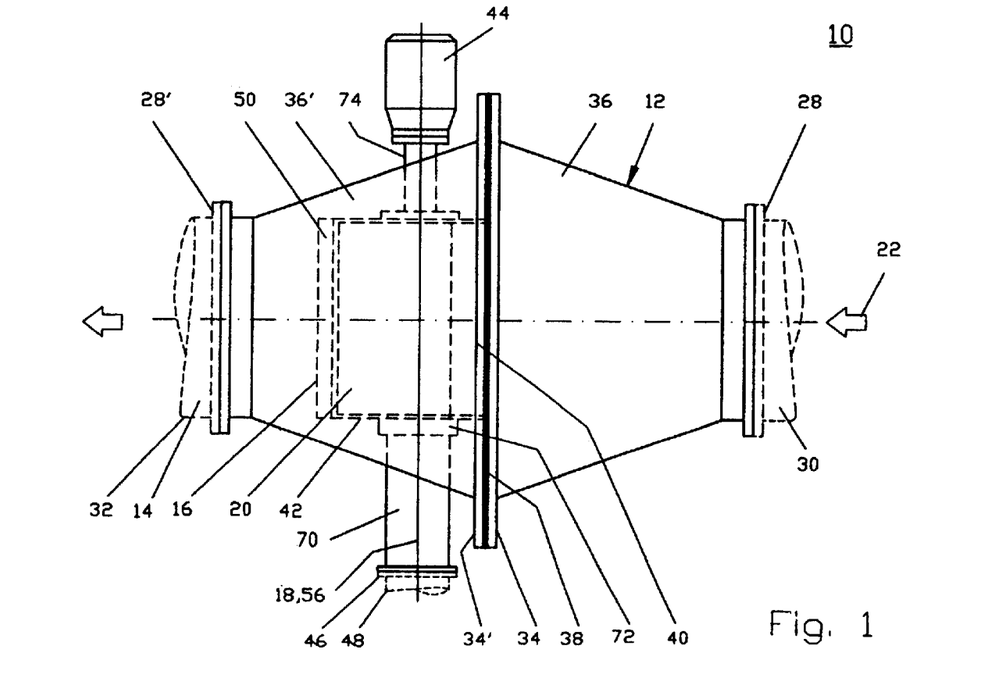
FIG. 1 is a side view, oblique to the axle of the moveable suction device, an initial embodiment of the device constructed according to the invention for mechanically purifying fluids, in this case, with conically formed pipe segments that are flanged together between the connecting pipe segment carrying the cooling water.
Figure 2:
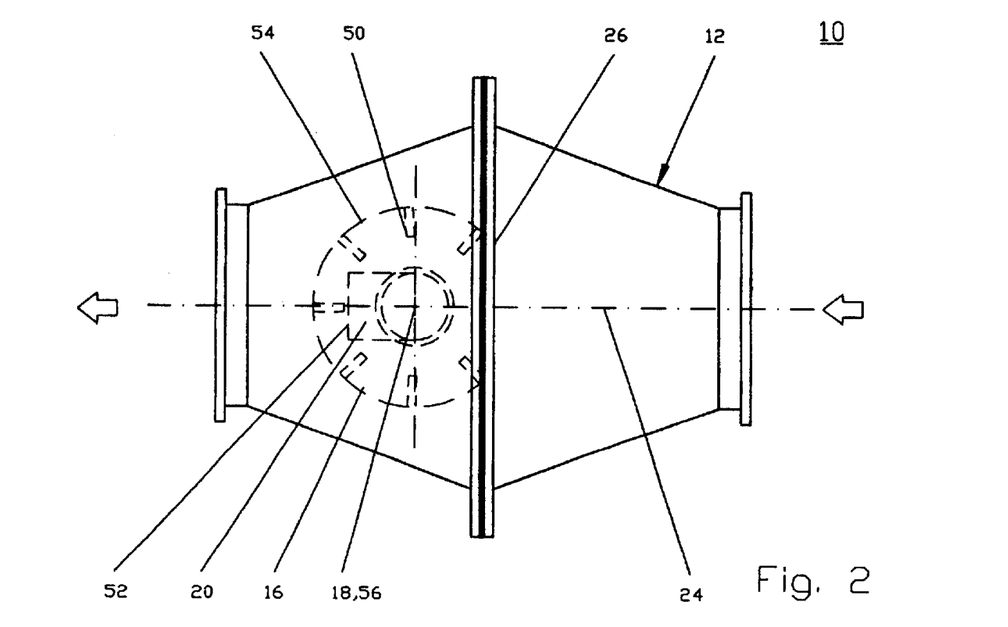
FIG. 2 is a side view, rotated 90°, of the arrangement according to FIG. 1.

FIG. 1 shows a side view of a device 10 for mechanically cleaning fluids, in particular, for cleaning the cooling water fed into a heat exchanger, with a pipe segment 12 (comprised of two parts here) as casing for the device, a sieve element 16 which essentially covers pipe segment 14 and with a suction device 20, moveable around axle 18, on influx side 22, for the purpose of aspirating surface areas and in this manner cleaning sieve element 16. Sieve element 16 forms a partially cylindrical casing, wherein cylinder axle 18 is perpendicular to axis 24 of pipe segment 12 and open part 26 of partially cylindrical casing 16 is arranged on influx side 22, as shown in FIG. 2, a view of the arrangement according to FIG. 1, rotated 90°. Influx side 22 is connected by a flange connection 28, for example, to pipe 30, through which the water that is to be mechanically cleaned is fed, for example sea water, which is to be used to cool a power plant, see directional arrow 22. The filtered water enters pipe 32, which is also connected by way of a flange connection 28' and from here is piped to the location where it will be used, for example, to heat exchanger devices.

As already mentioned above, pipe segment 12, depicted in FIG. 1, is comprised of two pipe segments 36, 36' that are flanged together, reference number 34, and that widen conically to part 34 that are flanged together. This conical widening results in the necessary space to accommodate mesh surface area 16, having a geometrical shape which is easy to manufacture, namely, a (partially) circular shape or a (partially) cylindrical shape. In the specific embodiments depicted in FIGS. 1 and 2, sieve 16 is attached to a plate 38, having a rectangular influx opening 40 for fluid 22 that is to be filtered to enter. This plate 38 is wedged between two flanges 34, 34' of the two conical pipe segments 36, 36'. Side areas 42 of sieve 16 can be closed surfaces or they can also be constructed as sieves themselves.

Aspiration rotor 20 is on the one side (in FIG. 1 the upper side) connected with a drive motor 44 and on the opposite side there is flange connection 46 to a waste water pipe 48 through which fluid with deposits from the sieve's mesh area can be disposed of during the backwash. The mesh surface area of sieve 16 can be constructed with or without webs (see also FIG. 3, to be elucidated), as can be seen in FIGS.

4 and 7, but webs 50 of this type are also provided in FIGS. 1 and 2. When webs 50 of this type are provided, suction pipe 20 has at its influx orifice 52 the same width and length—as accurate as possible—as prescribed by the length of webs 50 and their distance from one another, in such a manner, that chamber 54 formed between two webs 50 is sealed as tightly as possible with the corresponding setting of opening 52 of aspiration device 20. In this manner, an especially strong back-flow is created and the detritus from the sieve area within the chamber can be carried off by the pressure from the flow.

The arrangement of webs 50 has the advantage that even large-grained detritus, such as stones, mussels, fish etc. can be deposited between webs 50 on sieve 16 without impeding the rotary movement of aspiration rotor 20. When this type of webs 50 are used, then the mesh surface area of the sieve between the individual webs can be composed of flat sieve plates, so that the total surface mesh area of the sieve forms a polygon as in FIG. 2.

Figure 4:
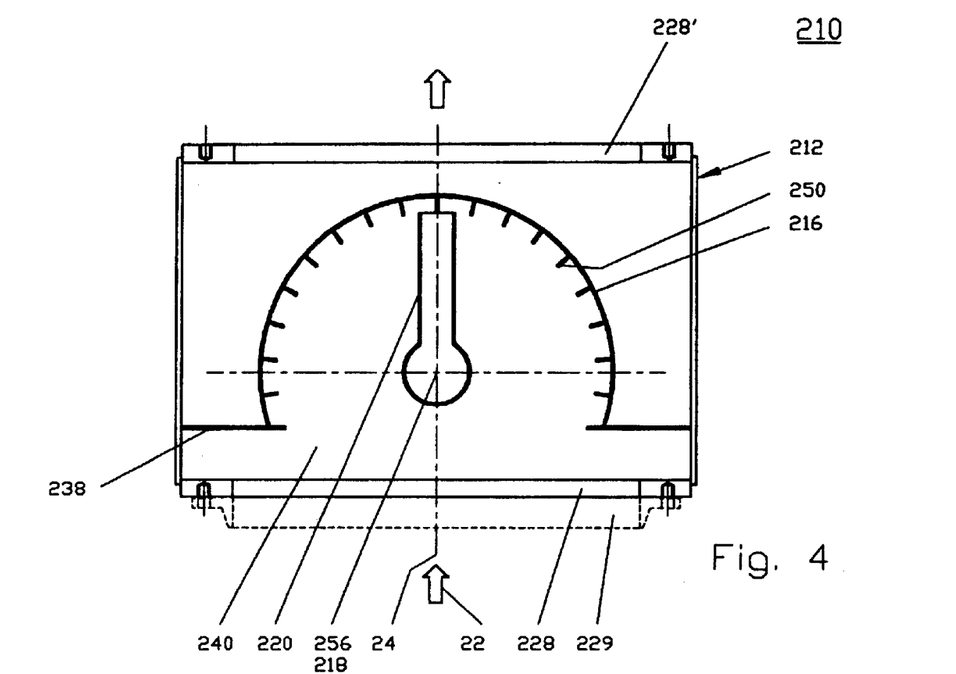
FIG. 4 is a view similar to FIG. 3, a specific embodiment in which the sieve device is provided with webs.
Figure 5:
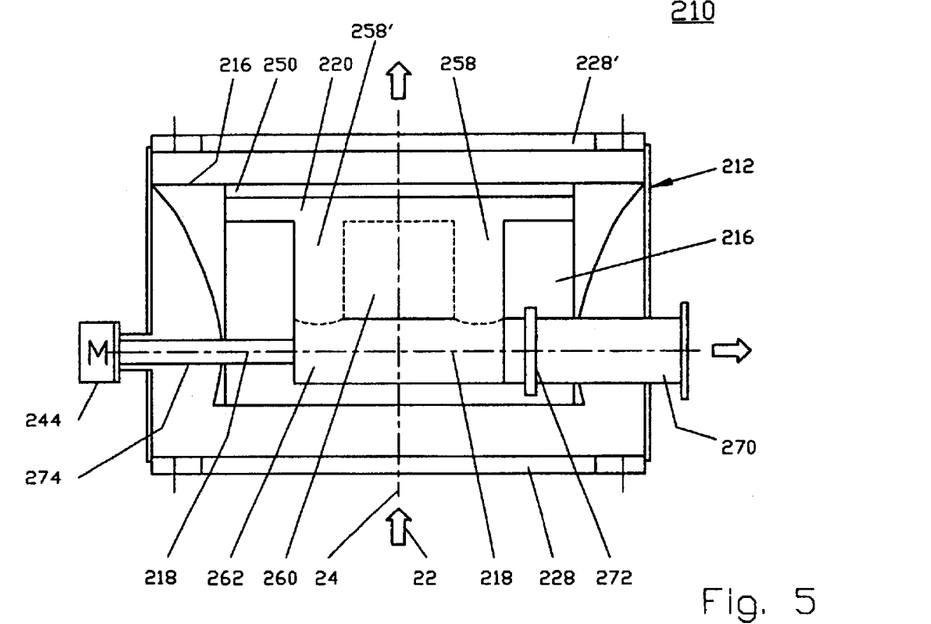
FIG. 5 is a (cut away) view from the right of the embodiment according to FIG. 4.
Figure 6:
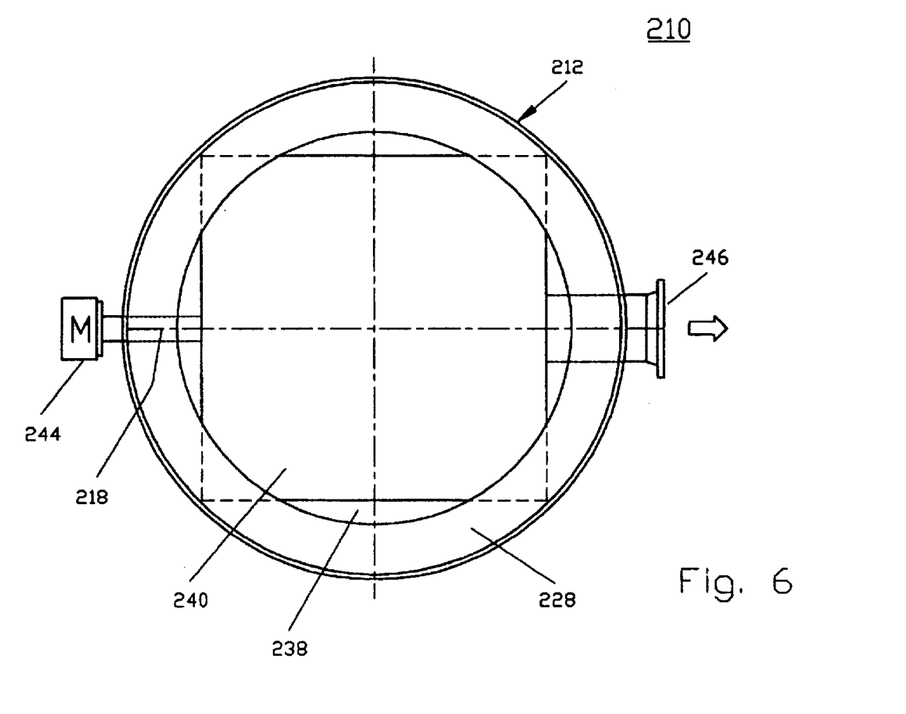
FIG. 6 is a view from above of the arrangement according to FIG. 4.

In the specific embodiments depicted in FIGS. 4 through 6, pipe segment 212, containing sieve element 216, of device 210 is made from a widened casing, whereby in this case the widening is achieved by ring flanges 228, 228'. The partially cylindrical mesh surface area 216 of the sieve can, in this case, also be formed by a circular shaped plate 238 having a rectangular opening 240, see also FIG. 6, onto which the edges of sieve 216 are welded or fastened in another manner. It is even more advantageous to provide two circular segments 538 (FIG. 9) which have the form of the pressure relief flaps shown in FIG. 8. The remainder of the cross-section between partially cylindrical sieve 516 and pipe wall 541 is closed by two partially cylindrical sheets 543, 543' that are welded onto pipe wall 541. The advantage of this is that the cross-section of the influx is larger and therefore the loss in pressure is smaller.

Figure 7:
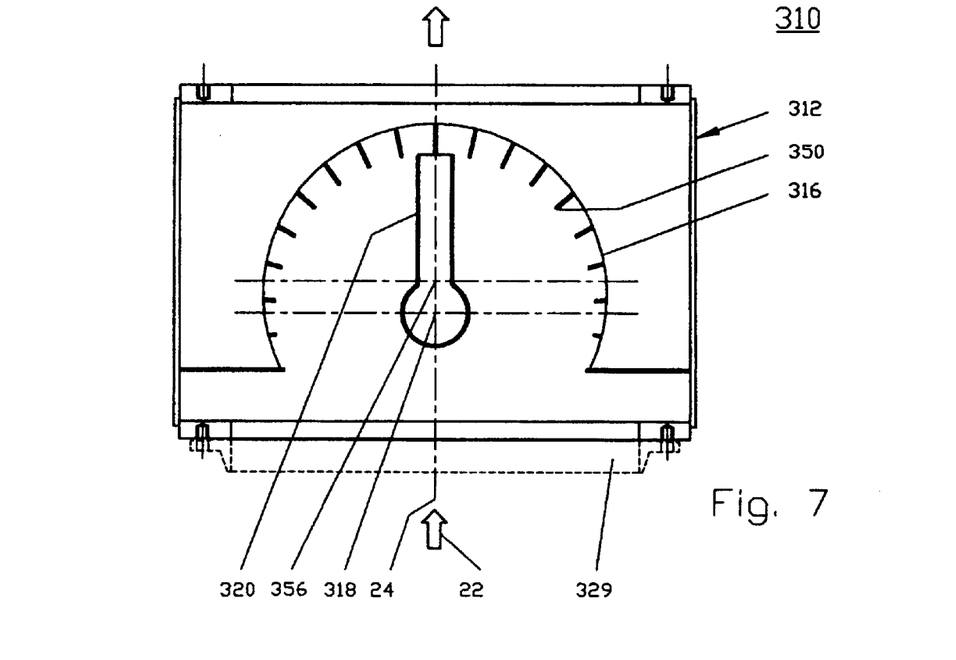
FIG. 7 is an alternative to the specific embodiment as depicted in FIG. 4, with webs of varying heights on the mesh surface area of the sieve, having the center of rotation for the rotor of the aspirating device shifted off-center.

In the specific embodiment with webs, as represented, for instance, in the FIGS. 4 and 7, the center of the sieve (reference number 256 according to FIG. 4 and 356 according to FIG. 7) can be different from the center of the rotor (reference number 218 in FIG. 4 and 318 in FIG. 7) when using webs of differing heights. The advantage of the specific embodiment represented in FIG. 7 is that in the area where a particularly large amount of detritus collects, namely in the main direction of the flow, the larger chambers formed by the higher webs can collect more detritus than the chambers on the sides, which will not catch so much detritus since there is less water flowing through this part.

In order to impede the cross-section of flow as little as possible for the main direction of flow, especially when aspiration rotor 220 is in the transverse position, this aspiration rotor can form two aspirating pipes or channels 258, 258'. The free space 260 between these two channels 258, 258' is available as additional cross-section of flow for main flow 22.

Figure 8:
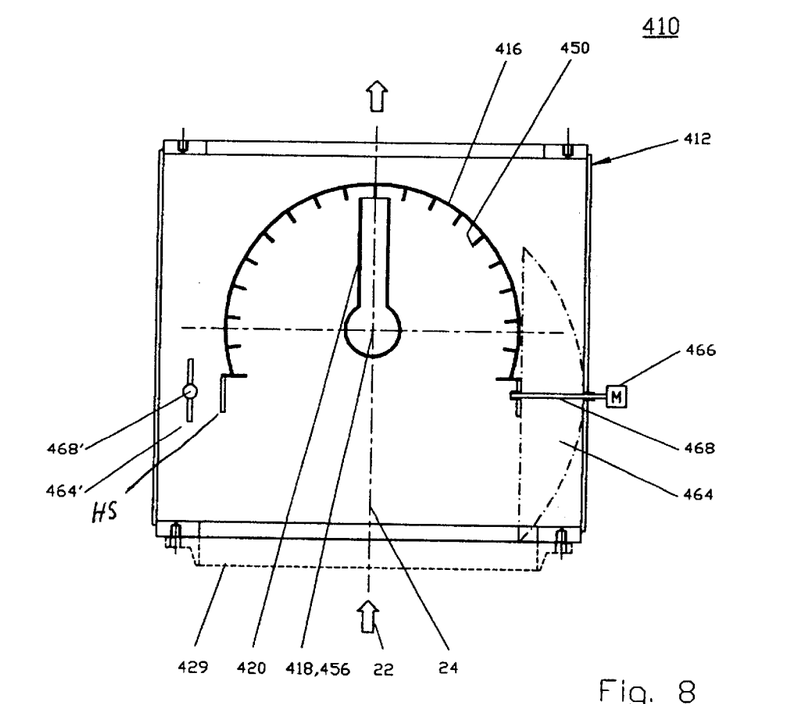
FIG. 8 is a specific embodiment with two pressure relief plates for the generation of a bypass, moveable around an axle of the sieve element parallel (representation on the left) and perpendicular axle (representation on the right)
Figure 9:
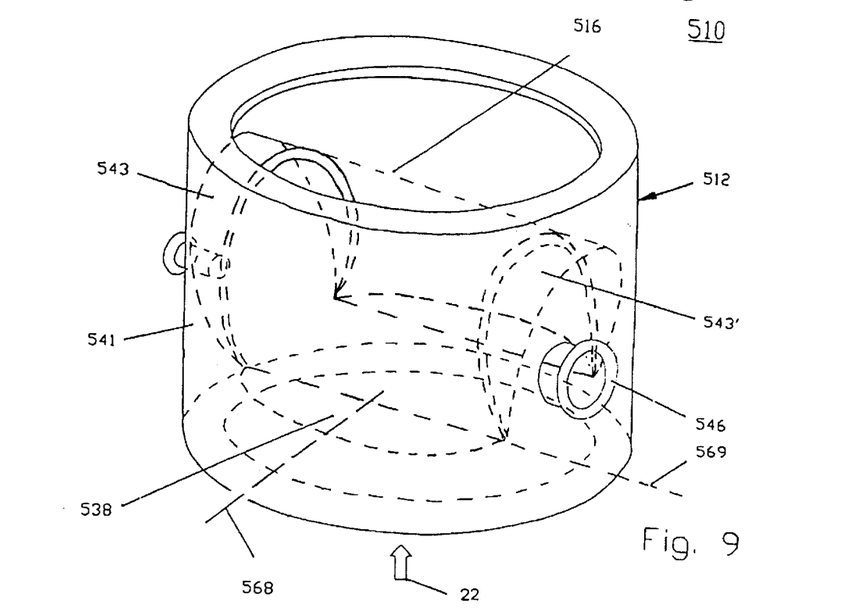
FIG. 9 is a perspective representation of still another specific embodiment.

The two aspirating pipes 258, 258' created for this purpose can either be round or can also have a rectangular cross-section. They can also have a rectangular cross-section at the upper end, as in FIG. 5 and at the lower end have rounded flanges to which waste water pipe 262 can be welded. In FIG. 8, in the right half, a specific embodiment is shown, which has two pressure relief flaps 464 which can be pivoted/swivelled around a shaft 468 by means of a drive motor 466 from a position perpendicular to the plane of the paper—closed position—to a by-pass position in the plane of the paper, represented with a broken line, in order to create in this way a by-pass path in the event that the sieve area is blocked creating an unacceptably high pressure. Axis of rotation 468 of pressure relief plates 464 is perpendicular here to axle 418 of sieve element 416.

In the left half of FIG. 8, an arrangement is in which fulcrum shaft axle 468' of pressure relief flaps 464' is parallel to axle 418 of sieve element 416.

Flange 229 of the connecting pipe for the influx of the fluid to be treated is shown in each of the FIGS. 4, 7 and 8.

A screw connection 272 which screws on tightly is provided in order to enable suction device 20, 220 to pivot or rotate around axle 18, 218, despite connection pipe 70, 270 being stationary. Screw connection 272 functions simultaneously as a support. A connecting fulcrum axle shaft 74, 274 functions as support on the other side of suction device 20, 220, whereby the support points themselves are held in place, in a suitable manner, by the casing walls or by separation devices that are carried on these casing walls.

Figure 10:
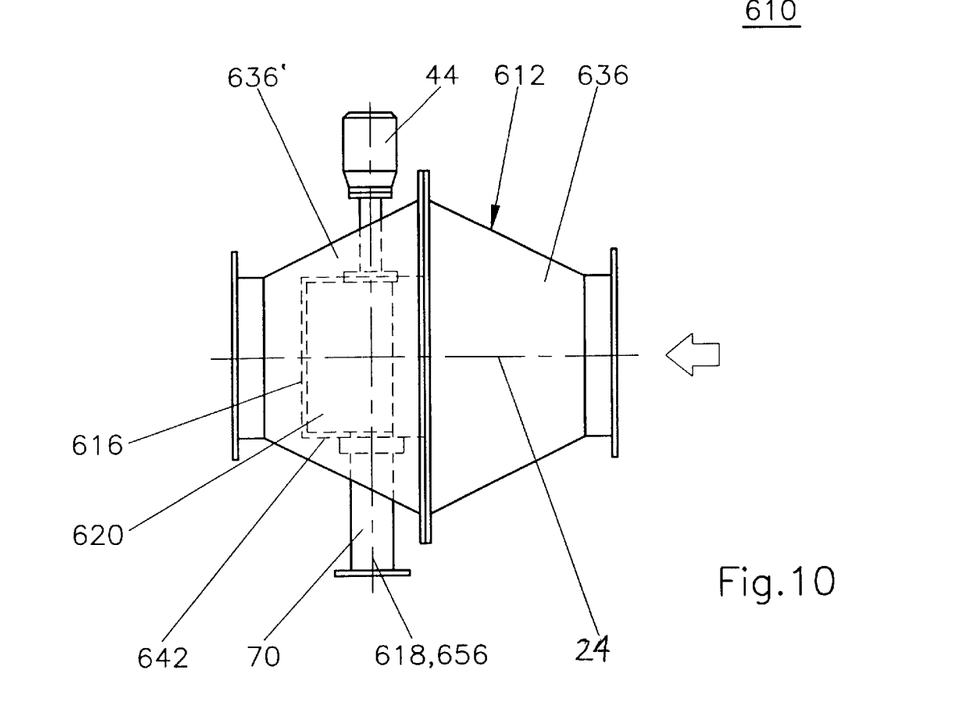
FIG. 10 is a view similar to FIG. 1, a specific embodiment with a U-shaped sieve element.
Figure 11:
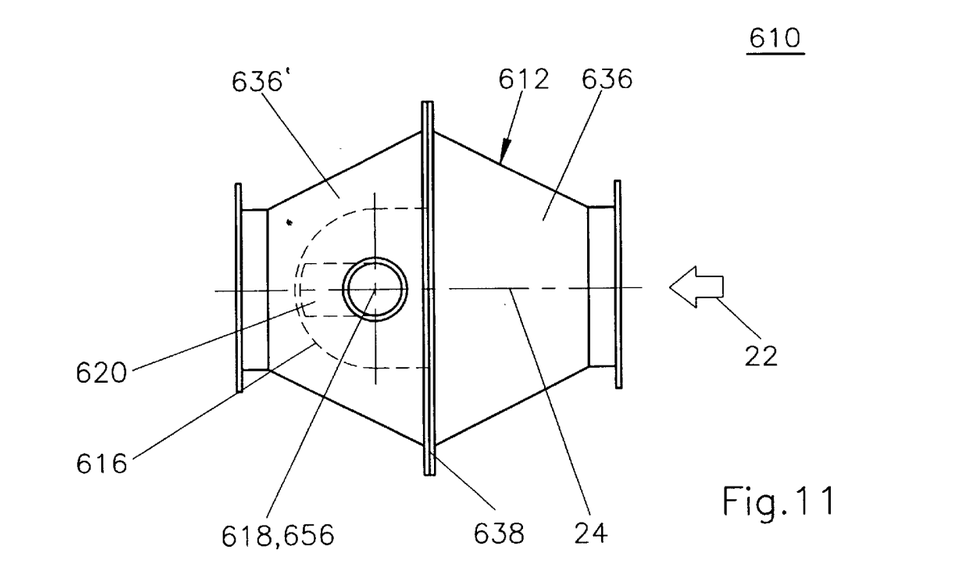
FIG. 11 is a view similar to FIG. 2, the specific embodiment with the U-shaped sieve element of FIG. 10.

The cross-section of sieve element 616 can occur as a semi-circle with straight extensions that are affixed parallel to each other (U-shaped), see FIG. 10, a view similar to FIG. 1, and FIG. 11, a view similar to FIG. 2. This results in a larger mesh surface area of the sieve and, in this way, less pressure loss.

Figure 13:
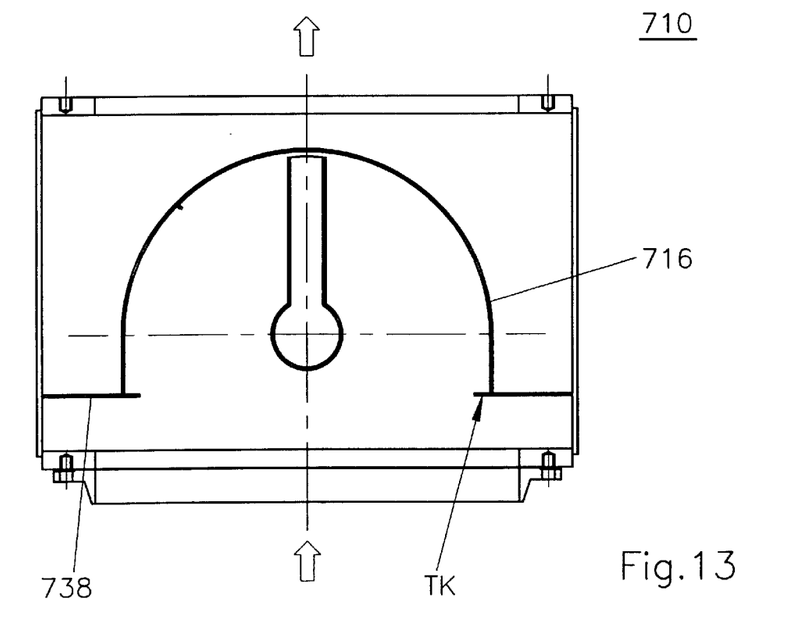
Figure 14:
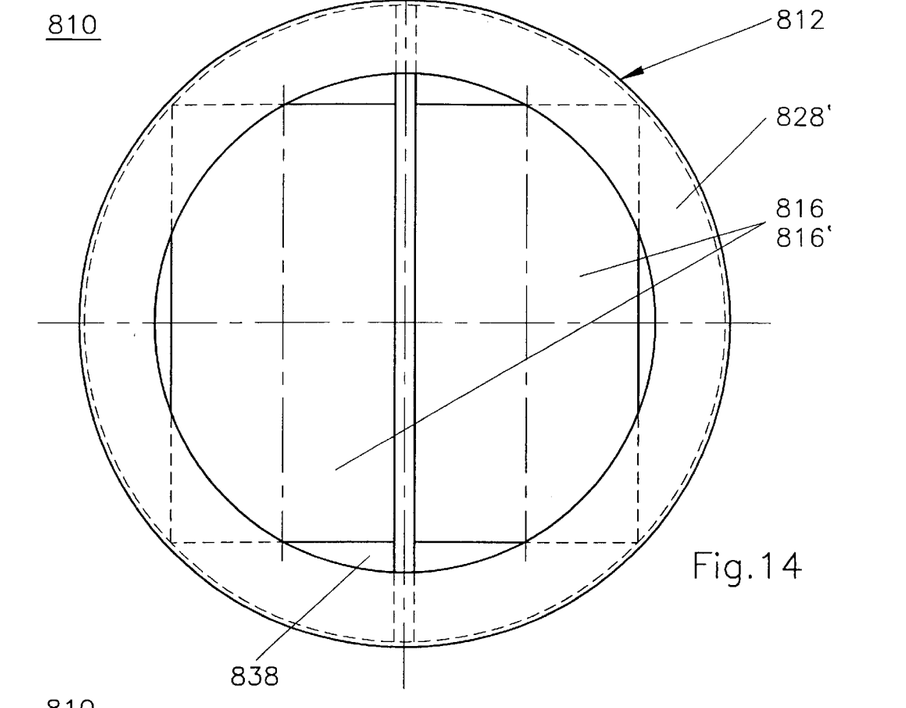
FIG. 14 is a view of a specific embodiment with two sieve elements.
Figure 15:
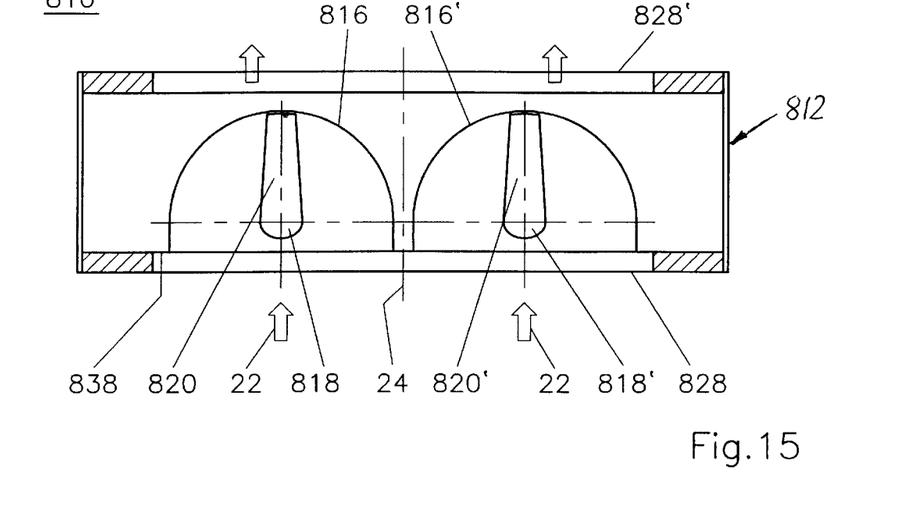
FIG. 15 a cut away view of the specific embodiment of FIG. 14.

If two (or more than two, not shown) sieve elements 816, 816' are provided, according to FIG. 14 and 15, the result is an increase of reliability through redundance. Changing seals and maintaining each individual sieve element can be done, while at the same time the other sieve element remains in operation. In addition, the overall length is decreased while the diameter remains the same, compare FIG. 13. In this manner, the modernization of conventional cooling water filters is simplified, since, in these cases, space is scarce.

Figure 12:
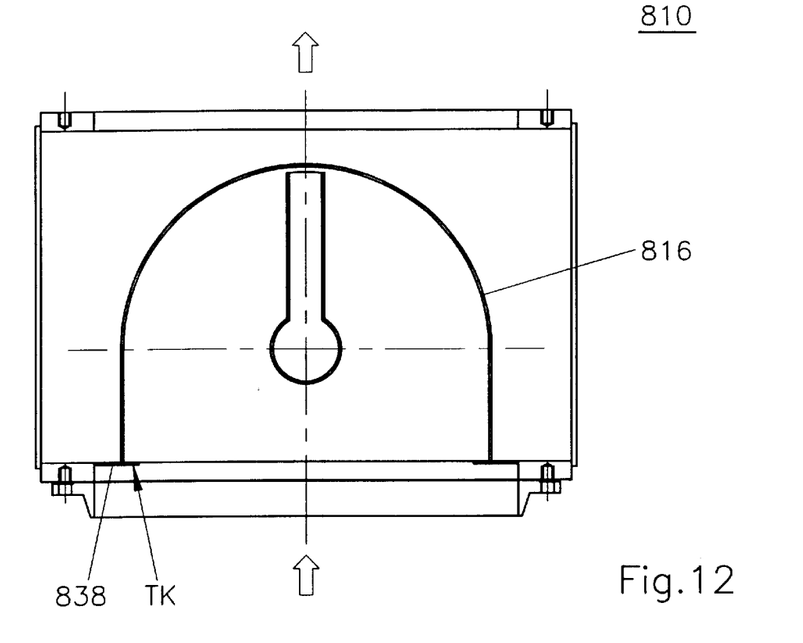
FIGS. 12 and 13 are views similar to FIG. 3, each specific embodiment with a U-shaped sieve element which extends to the flange; where the edges of the holding sheet jut out in order to generate turbulence.

Areas of turbulence TK are generated, according to FIG. 12 or 13, by way of holding sheets 738 and 838 jutting out into the cross section of the flow in the bottom area of the sieve cylinder casing. The turbulence thus generated in the flow in this manner results in an auto-cleansing of the unbent portion of the sieve, for example, a sieve element that is U-shaped in cross section.

The same applies for a holding structure HS (see FIGS. 8 and 9) that is connected to the inner wall of the pipe segment, which results in a rectangular flow-through cross section 240, which is covered by the open ends of the partially cylindrical casing: In this case, the holding structure may jut out into the cross-section of the flow and form areas of turbulence TK in the desired areas.

In specific embodiments without inner segmental ribs, for example, see FIGS. 3, 11, 12, 13, large volumes of detritus can be pushed through the rotor, until rotor opening 620 (FIG. 11) is cleared and can suction off the detritus.

Figure 3:
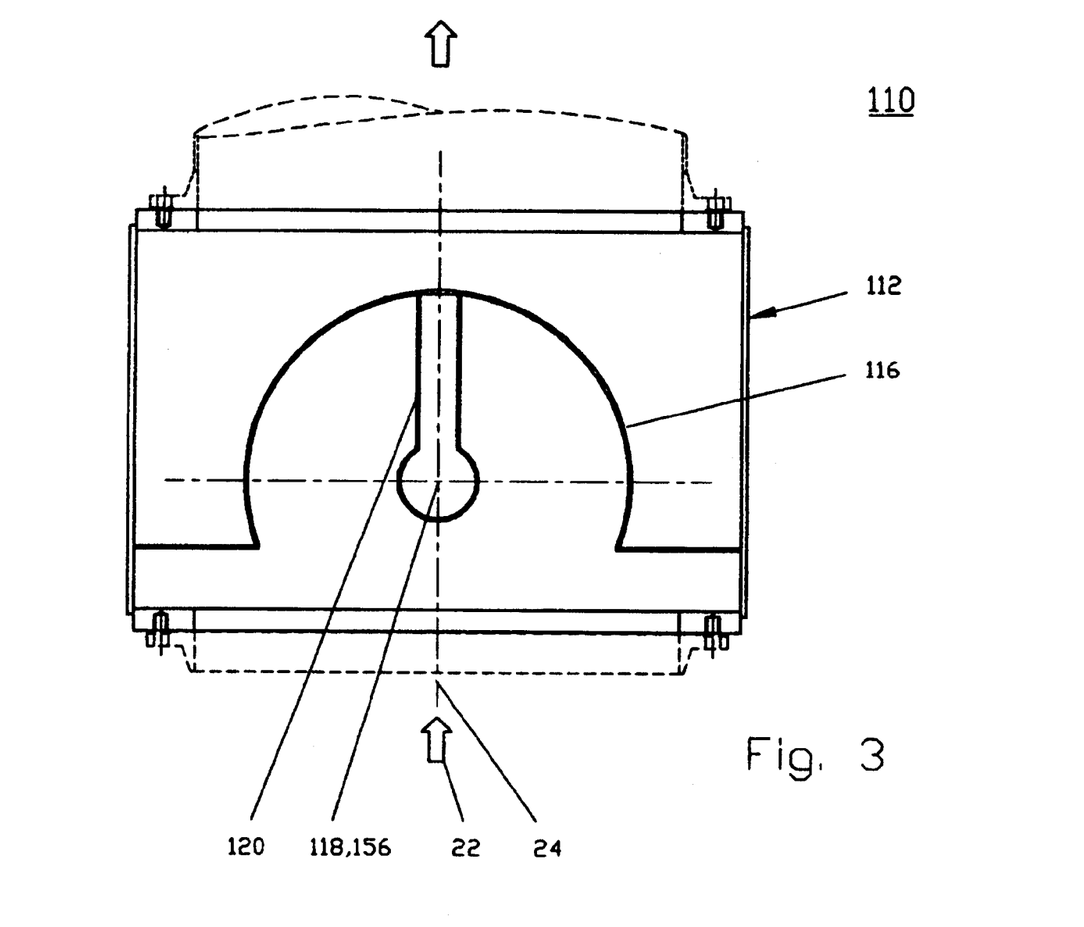
FIG. 3 is a side view of another specific embodiment, in which the pipe segment enveloping the sieve device has a larger diameter than the connecting pipe which follows it.

The specific embodiment depicted in FIG. 12, a view similar to FIG. 3, has a U-shaped sieve element which extends to the flange; in this case, edges of the holding sheet that jut out generate the turbulence. In FIG. 13, a view similar to FIG. 3, a specific embodiment is shown, which also has a U-shaped sieve element, which, however, does not extend to the flange. In this case, the edges of the holding sheets also generate turbulence.

These areas of turbulence can also occur in the specific embodiment depicted in FIGS. 14 and 15, which is provided with two sieve elements 816, 816', according to FIG. 12.

The version, according to FIG. 13, can also be reduced in size and then with the same cross section be applied numerous times in order to reduce the over all length. The same applies to still other versions described.

What is claimed is:

1. A device for mechanically cleaning fluids flowing into or through a pipe, comprising a housing having a first open end and a second open end, said first open end or said second open end, or both, being adapted to join in fluid communication with said pipe, said housing comprising a sieve element having a size sufficient to essentially cover the cross-sectional area of the opening of said pipe, a suction device on an influx side of said sieve, movable about an axis to aspirate and clean the surface area of the sieve element, said sieve element forming a partially cylindrical casing having a cylinder axis which is perpendicular to the axis running from said first open end to said second open end of said housing and being open towards one of said first and second open ends of said housing, and further comprising one or two pressure relief plates for defining a bypass around said sieve element, said one or two pressure relief plates being rotatable about respective axes which are perpendicular or parallel to the axis running from said first open end of said housing to said second open end.

2. Device for mechanically cleaning fluids as recited in claim 1 wherein a holding plate is attached to an inner wall of the housing for holding said sieve element.

3. Device for mechanically cleaning fluids as recited in claim 1 wherein suction device is provided with a drive motor on one of its sides and with aspirating pipe on its other side.

4. Device for mechanically cleaning fluids as recited in claim 1 wherein a mesh surface of sieve element is provided with webs on the influx side.

5. Device for mechanically cleaning fluids as recited in claim 4 wherein the webs form chambers that have a length and a width adapted to the corresponding measurements of the chambers and the aspirating pipe has a length and a width at its open end adapted to the corresponding measurements of the chambers.

6. Device for mechanically cleaning fluids as recited in claim 1 wherein suction device has two or more aspirating pipes or aspirating channels.

7. Device for mechanically cleaning fluids as recited in claim 6 wherein two aspirating pipes are comprised of two pipes that have in the vicinity of sieve initially a rectangular cross section, that then, however, in a direction of the axis of the suction device turns into a round cross section.

8. Device for mechanically cleaning fluids as recited in claim 6 wherein the aspirating pipes are constructed of tin with a rounded edging at the pipe.

\* \* \* \* \*